United States Patent [19]

Kozlov et al.

[11] 4,214,139
[45] Jul. 22, 1980

[54] APPARATUS FOR SURFACING INTERNAL COMBUSTION ENGINES VALVES

[76] Inventors: Anatoly E. Kozlov, ulitsa Revoljutsionnaya, 73, kv. 85, Tolyatti; Bogdan P. Budzan, Dneprovskaya naberezhnaya, 11, kv. 122, Kiev; Daniil A. Dudko, ulitsa Anri Barbjusa, 22/26, kv. 113, Kiev; Boleslav I. Maximovich, ulitsa Anri Barbjusa, 22/26, kv. 107, Kiev; Vitaly V. Zavodian, bulvar Lepse, 55, kv. 20, Kiev; Anatoly A. Mozzhukhin, ulitsa Grodnenskaya, 3/5, kv. 37, Kiev; Vladimir P. Sotchenko, ulitsa P. Tychiny, 13, kv. 210, Kiev; Vladimir M. Golovnin, Moskovsky prospekt, 78/178, kv. 338; Nail S. Farrakhov, ulitsa Jubileinaya, 1114, kv. 142, both of Tolyatti, all of U.S.S.R.

[21] Appl. No.: 885,201

[22] Filed: Mar. 10, 1978

[51] Int. Cl.² .......................... B05C 13/02; H05B 5/00
[52] U.S. Cl. ..................................... 219/9.5; 118/620; 219/10.69; 228/6 R; 228/48
[58] Field of Search .................... 228/4.1, 6 R, 47–48, 228/49 R; 219/9.5, 10.69, 10.73; 198/402, 406; 193/47; 118/409, 500, 620; 29/771, 786–790

[56] References Cited

U.S. PATENT DOCUMENTS

| | | | |
|---|---|---|---|
| 1,421,056 | 6/1922 | Alling et al. | 193/47 |
| 2,585,697 | 2/1952 | Sommer et al. | 198/402 |
| 3,320,397 | 5/1967 | Alexander et al. | 219/10.69 |
| 3,504,148 | 3/1970 | Maximovich et al. | 219/9.5 |
| 3,564,693 | 2/1971 | Avernhammer | 29/771 |
| 3,911,859 | 10/1975 | Dudko et al. | 118/620 X |
| 4,116,375 | 9/1978 | Mozzhukhin et al. | 228/48 |
| 4,144,432 | 3/1979 | Mozzhukhin et al. | 219/9.5 |

FOREIGN PATENT DOCUMENTS 292400  9/1972  U.S.S.R. .

Primary Examiner—Francis S. Husar
Assistant Examiner—K. J. Ramsey
Attorney, Agent, or Firm—Fleit & Jacobson

[57] ABSTRACT

An apparatus for surfacing valves by fusing in a high-frequency current field refractory alloy rings applied to the seating surfaces of the valves. The apparatus comprises a tubular body provided with chutes adjoining thereto. The chutes are adapted respectively to feed valves and rings to be fused. After a valve and a ring is assembled under the action of gravity inside the tubular body, the valve with the ring to be fused is delivered by a pusher to a mechanism fixing the valve in a heater. The pusher is mounted for reversible movement in the hozizontal plane.

6 Claims, 4 Drawing Figures

APPARATUS FOR SURFACING INTERNAL COMBUSTION ENGINES VALVES

The present invention relates to apparatus for hard surfacing machine parts and, more particularly, to apparatus for applying a refractory alloy coating to the seating surfaces of valves for internal combustion engines.

The term "seating surface" is used herein to denote the chamfer formed in the head of the internal combustion engine valve that ensures a tight fit between the valve and the corresponding chamfer of the valve seat.

There are known apparatus for surfacing internal combustion engine valves (cf. Inventor's certificate of the USSR No. 292400. In this apparatus the steps of fitting a ring onto a valve, delivering said valve to a heater and fixing the valve within the latter are carried out automatically.

The known apparatus comprises a means for fitting a ring to be fused on to a valve and positioning it head downwards in an electrical induction heater. A pushing means provided with a platform and adapted for delivering the valve with the ring thereon to the heater means is provided for fixing the valve within the heater.

The means for fitting the ring to be fused onto the valve and positioning its stem upwards is formed by two kinematically linked mechanisms. One mechanism drops the ring over the valve stem and the other mechanism positions the valve with the ring thereon stem upwards and conveys it to the inductor.

The mechanism for dropping the ring over the valve stem comprises a support adapted to receive the ring and formed of a drum loosely fitted on a vertical shaft, the bottom end of the drum being provided with a roller interacting with a stationary cam. Another drum is fixed on the same shaft, which drum receives the valve conveyed along the guides stem downwards. With the rotation of the shaft, the support interacts through the roller with the cam and moves upwards for dropping the ring placed thereon over the valve stem.

The mechanism for positioning the valve stem upwards and for conveying the valve with the ring thereon to the inductor is formed of a manipulator. The manipulator comprises a vertical shaft provided with a bearing assembly on the upper end thereof in which a horizontal shaft is mounted. Clamps are attached to one end of the horizontal shaft, and a bevel pinion to the other end thereof. The bevel pinion engages a stationary bevel gear.

The vertical shaft of the mechanism for dropping the ring over the valve stem is parallel to the vertical shaft of the manipulator and is kinematically linked thereto, said linkage ensuring synchronous rotation of both shafts for oppositely bringing in line the valve with the ring positioned on the head thereof and the clamps.

Although in this apparatus the steps of fitting the ring to be fused onto the valve and delivering the latter to the heater are done automatically its application involves certain difficulties.

The use of two mechanisms, one for fitting the ring on to the valve and another for positioning said valve stem upwards and for delivering thereof to the heater, complicates the construction of the apparatus. As a result these operations are carried out in the consecutive order, which, naturally, reduces the efficiency of surfacing process. Moreover, in order to ensure a kinematic linkage between the vertical shaft of the mechanism for fitting the ring onto the valve and that of the manipulator, the foregoing apparatus is provided with Geneva mechanisms, which makes more complicated both the apparatus and the control system thereof.

It is significant to here note that the presence of a fair number of mechanisms, firstly, raises the price of the apparatus essentially and, secondly, reduces its reliability.

The invention has for its object the provision of an apparatus for surfacing internal combustion engine valves of the type which are simple to manufacture.

Another object of the invention is to provide an apparatus for surfacing internal combustion engine valves, which is easy to control and provides reliable operation.

A further object of the invention is to provide an apparatus for surfacing internal combustion engine valves which ensures a considerable reduction of the time consumed by auxiliary operations, i.e. by assembling the valve with the ring, by positioning the valve stem upwards and by feeding the valve into the heater.

Yet another object of the present invention is to provide in an apparatus for surfacing internal combustion engine valves a simplified means for fitting a ring to be fused onto a valve and positioning its head downwards which functions by utilizing the forces of gravity of the valves and of the rings to be fused.

A general object of the invention is to provide an apparatus for surfacing internal combustion engine valves which, while featuring maximum simplicity and reliability, ensures a high efficiency of the process.

SUMMARY OF THE INVENTION

In accordance with the foregoing and other objects, the invention relates to apparatus for surfacing internal combustion engine valves by fusing refractory alloy rings applied to the seating surfaces of the valves. The apparatus includes a means for fitting a ring to be fused onto the valve and positioning its head downwards, a heating means, a pushing means provided with a platform and adapted for delivering the valve with the ring thereon to the heating means, and a means for fixing the valve within the latter. According to the invention, the means for fitting the ring onto the valve and positioning its head downwards consists of a vertically positioned tubular body having in its wall a transverse slot and feed chutes inclined towards said tubular body one of said chutes adjoining the upper end of said body is adapted for feeding thereto the valves head upwards, whereas the other chute adjoining the wall of said body is adapted for delivering the rings through said transverse slot, to the interior of said body. The upper portion of said body is provided with a thrust member interacting with the valve stem so that the valve is in a head-downwards position when said valve enters said body. Pushing means are mounted underneath said body for reversible movement to be thereby alternatively placed under the tubular body and under the heating means.

To ensure reliable fitting of the ring onto the valve, i.e. to prevent the ring from dropping edgewise and missing the valve stem, it is expedient to provide the tubular body wall with a horizontal slit disposed below the transverse slot and through which a plate-like a shutter is driven by reversible drive, said shutter is adapted to receive and to support the ring in the horizontal position. The drive subsequently withdraws the shutter from said body in order to drop the ring.

To make sure that the ring is placed right, e.g. chamfered side downwards, it is expedient to provide the tubular body wall with a horizontal slit disposed above the transverse slot and through which passes another plate-like shutter, connected with the first shutter, the two shutters being spaced apart from each other within a distance less than the outer diameter of the ring, so that undesired turning-over of the ring is prevented inside the tubular body.

It is practical to mount the pushing means in the form of a vertically positioned pressure fluid cylinder on a carriage moving along guides associating with a pressure fluid cylinder for reversible movement of the pushing means in the horizontal plane.

It is advisable to provide the lower portion of the tubular body with an opening extending from the butt end thereof, through which the valve is brought out from the tubular body, with the pushing means moved under the heating means.

To ensure the upright position of the valve inside the tubular body a sleeve may be mounted on the pushing means in alignment with the platform in such a manner that the distance between the upper end of the sleeve and the bearing surface of the platform is such that the upper internal edge of the sleeve restricts the angle of inclination of the valve to a value at which the projection of the centre of gravity of the valve lies on the horizontal plane within the limits of the bearing surface of the valve.

Thus, the present invention utilizes a tubular body with chutes adjoining the body to provide means for fitting a ring to be fused onto a valve and positioning its head downwards. The chutes feed rings and valves, respectively, and allows fitting the rings onto the valves to be accomplished by utilizing the forces of gravity and at the same time simplifies the construction of the apparatus. It also provides the possibility to reduce the time consumed by those auxiliary operations and, as a result, to intensify the process.

The present and other objects and advantages of the invention will become apparent from a detailed consideration of the embodiments thereof with reference to the accompanying drawings.

DESCRIPTION OF THE PREFERRED EMBODIMENT OF THE INVENTION

Figure 1:
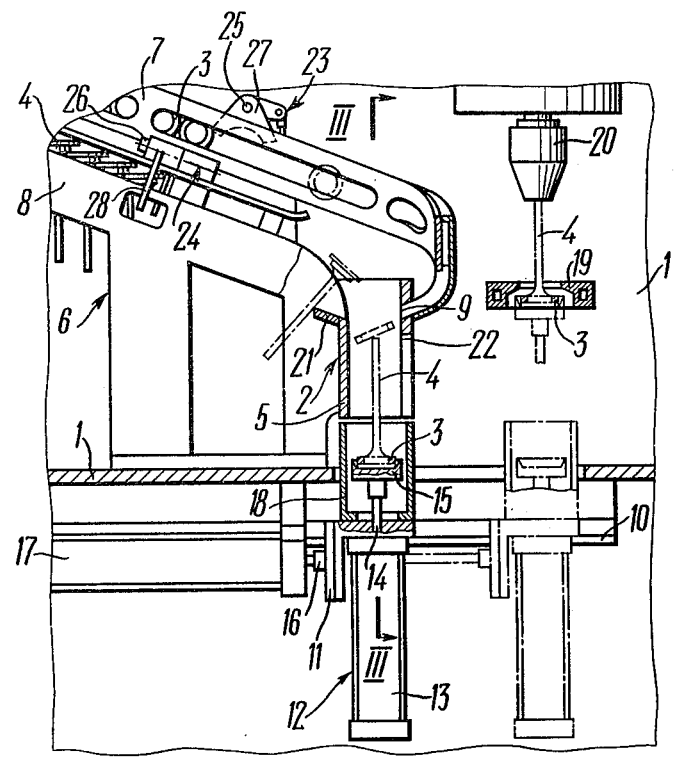
FIG. 1 is a diagrammatic view partly in section of an apparatus for surfacing internal combustion engine valves in accordance with the invention.

Referring to FIG. 1 of the drawings the apparatus for surfacing internal combustion engine valves comprises a bed plate 1. The bed plate 1 mounts a means 2 for fitting a ring 3 to be fused onto a valve 4 and positioning its head downwards, said means consisting of a tubular body 5 and inclined feed chutes 6 and 7 adjoining thereto.

The chute 6 adjoins the upper end of the tubular body 5 and is adapted for feeding thereto the valves 4 head upwards. The chute 6 is formed by two parallel guide plates 8 inclined towards the tubular body 5 at an angle sufficient for the valve to move thereto by gravity.

A transverse slot 9 is formed in the wall of the tubular body 5.

Figure 2:
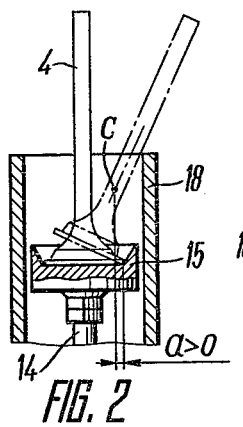
FIG. 2 shows, by way of example, vertical positioning of a valve on a platform disposed within a sleeve.
Figure 3:
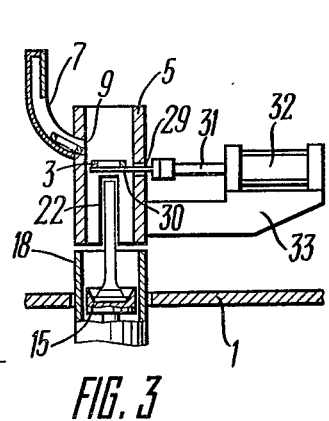
FIG. 3 shows an embodiment of the tubular body provided with a shutter for receiving and supporting a ring to be fused in the horizontal position.

The chute 7 is box like in cross-section, elongated in the vertical direction according to the shape of the ring 3 positioned edgewise. The chute 7 is inclined with respect to the horizontal plane in order to ensure the rocking motion of the rings by gravity. Near the tubular body 5 the chute 7, descending vertically, bends and in point of abutting the transverse slot 9 (FIGS. 1, 2 and 3) becomes almost horizontal.

Below the tubular body 5, the bed plate 1 (FIG. 1) mounts guides 10 with a carriage 11 disposed thereon, which carriage supports a pusher 12. The pusher 12 is formed of a pressure fluid cylinder 13 having a rod 14 which carries a platform 15 provided with an annular tapered shoulder and adapted for receiving the valve 4 head downwards. The carriage 11 is connected to the rod 16 of a pressure fluid cylinder 17 attached to the bed plate 1.

To prevent the moving valve from tilting or from falling under the action of inertial forces a sleeve 18 is mounted on the carriage 11 or directly on pusher 12, in coaxial relation to the casing of the pressure fluid cylinder 13, and the rod 14 said sleeve accommodating the rod 14 with the platform 15 thereon.

The sleeve 18 (FIGS. 1 and 2) is of such a height that the distance between the upper end thereof and the bearing surface of the platform disposed in its lower position is sufficient for the upper internal edge of the sleeve to restrict the angle of inclination of the valve 4 to a value at which the projection of the centre of gravity of the valve (point C) lies in the plane within the limits of the bearing surface (butt end of the head) of the valve. Thus it is guaranteed that the valve will remain in a vertical position in case of rocking or tilting.

A heating means formed of a high-frequency inductor 19 is mounted on the bed plate 1 (FIG. 1) of the apparatus. A means for fixing the valve 4 is disposed above the inductor 19, which means is formed of a chuck 20 provided with drives (not shown) for clamping and rotating thereof and adapted for clamping the stem of the valve 4 and rotating the latter about its axis.

The upper portion of the tubular body 5 has a thrust member 21 which in this embodiment is attached directly to the tubular body 5.

For the purpose of removal of the valve with the ring thereon from the tubular body 5, the bottom portion of the latter is provided with opening 22 extending from the butt end thereof.

The chutes 6 and 7 carry devices 23 and 24 adapted to pick one ring and one valve, respectively, from the lines of rings and valves. Such devices are well known in the art, and any of them may be chosen when utilizing an apparatus according to the invention, e.g. the one comprising pivoted rockers 27 and 28, as in the given embodiment.

In order to afford a better understanding of the apparatus for surfacing internal combustion engine valves according to the invention, an automatic mode of operation thereof will be described; the means providing this mode of operation, which do not come within the scope of the invention, are not shown in the drawings and are not dwelt upon in the description in order to avoid a bulky description and difficulties in the disclosure of the subject matter of the invention.

In the following example illustrating the operation of the apparatus said means are referred to as the control system.

The operation of the foregoing apparatus for surfacing internal combustion engine valves is as follows.

Upon receiving a command for piecemeal delivering valves 4, the rocker 28, making a rocking motion, releases with one arm thereof the value 4 being held by it, and with the other arm shuts off the chute 6 so as to prevent the movement of the following valves. The released valve, with its head sliding along the surface of the guiding plates 8, advances towards the tubular body 5 by gravity. Having reached the tubular body 5, the valve 4 hits with its stem the thrust member 21 and is positioned with its head downwards. The valve then falls into the interior of the tubular body and rests with its head on the bearing surface of the platform 15.

A command is issued for delivering a ring 3 to be fused, and the rocker 27 makes a rocking motion and releases the ring held by one of its arms, simultaneously introducing the second arm into the chute 7, thereby preventing the movement of the following rings. Then, turning back, the rocker withdraws the second arm from chute 7 and introduces therein its first arm. The rings move till they thrust against the first arm, and remain in this position till the next cycle.

The released ring, advancing down, along the chute 7 towards the tubular body 5, occupies a nearly horizontal position. Under the action of gravity and inertia, the ring 3 to be fused enters through the transverse slot 9 the tubular body 5 drops over the valve stem. Resting on the head of the valve 4, the ring 3 is directed by the tapered shoulder of the platform 15 into the position wherein it will be fused.

A command is issued for delivering the valve 4 with the ring 3 thereon to the heater 19. The pressure fluid cylinder 17 is actuated, and the rod 16 thereof moves, along the guides 10, the carriage 11 together with the pusher 12. Moving into the position under the heater 19, the pusher 12 withdraws the valve with the ring thereon from the tubular body 5, the opening 22 ensuring the withdrawal of the valve stem.

On taking up the position wherein the axis of the pusher 12 is almost in alignment with the axis of the heater 19, a command is issued to feed the valve 4 into the heater 19. The pressure fluid cylinder 13 is actuated, and the rod 14 thereof moving upwards conveys the valve 4 with the ring 3 positioned on the platform 15 towards the heater 19 and the chuck 20. When the end of the valve stem reaches the opening (not shown) of the chuck 20, and, accordingly, the head of the valve 4 the opening of the high-frequency inductor 19, the end of the valve stem presses the limit switch (not shown) arranged inside the opening of the chuck 20. At this time according to the control system the following commands are issued: to close and to rotate the chuck 20, to energize the high-frequency inductor 19, to move downwards the rod 14 with the platform 15 thereon and to actuate the pressure fluid cylinder 17 in order to withdraw the carriage 11 together with the pusher 12 from under the heater 19.

The refractory alloy ring 3 being melted in the high-frequency current field is fused onto the head of the valve 4, the latter being rotated during the melting and fusion of the alloy so that a smooth coating thereof will be formed on the valve seating surface.

According to the operation of the control system the next valve and ring to be fused are fed into the tubular body. On the termination of the surfacing of the previous valve, a command is issued to unclamp the chuck, the valve is thrown therefrom, and the next valve with the ring to be fused is fed into the heater. The cycle is repeated in the automatic mode.

According to an alternative embodiment of the invention (FIG. 3), the wall of the tubular body 5 is provided with a horizontal slit 29, disposed below the transverse slot 9, through which passes a plate-like shutter 30. For reversible movement the shutter 30 is connected to the rod 31 of a pressure fluid cylinder 32 which is mounted on a bracket 33 attached to the tubular body 5.

In this embodiment the apparatus operates in the following manner.

In the initial position the shutter 30 is withdrawn from the tubular body 5.

A command is issued to actuate the device 24 for piecemeal delivering valves; the valve 4 picked up from the line of valves advances down along the chute 6 towards the tubular body 5. Having reached the tubular body 5, the valve 4 hits with its stem the thrust member 21 and is positioned with its head downwards. The valve then falls into the interior of the tubular body 5 and rests with its head on the bearing surface of the platform 15.

According to the operation of the control system, the pressure fluid cylinder 32 is actuated, and the rod of this cylinder introduces the shutter 30 to the interior of the tubular body 5.

A command is issued to the device 23 for delivering a ring 3 to be fused. Under the action of gravity and inertial forces the ring 3, advancing down along the chute 7, enters through the transverse slot 9 the tubular body 5. Having entered the tubular body 5 (FIG. 3), the ring 3 is placed on the shutter 30 in the horizontal position.

A command is issued to place the ring 3 on the valve 4. The pressure fluid cylinder 32 is actuated, and the shutter 30 is withdrawn from the tubular body 5 by the rod 31 of said cylinder. The ring 3, disposed on the shutter 30, drops over the valve stem and comes to rest on the valve head.

Hence forward the apparatus operates as described above.

The described embodiment is recommended when the outer diameter of the ring to be fused is considerably less than the diameter of the valve head. In this case the diameter of the bore of the tubular body may be too large for the ring to be fused, thereby providing for a great freedom of movement for the latter. As a result, the ring to be fused, when entering the tubular body and falling down, may turn edgewise and miss the stem of the valve.

Figure 4:
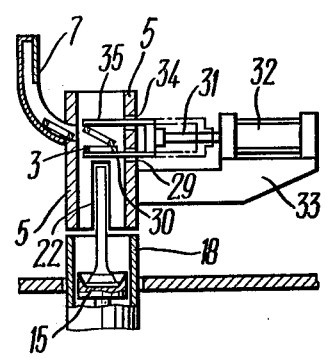
FIG. 4 shows in alternative embodiment of the tubular body provided with two shutters adapted to prevent the turning-over of a ring to be fused.

According to an alternative embodiment of the invention (FIG. 4), the wall of the tubular body 5 is provided with a horizontal slit 34 disposed above the transverse slot 9, through which passes a plate-like shutter 35. The shutter 35 is connected with the shutter 30, said shutters being spaced apart from each other a distance less than the outer diameter of the ring 3. This embodiment of the apparatus for surfacing internal combustion engine valves operates in the following manner.

In the initial position the shutters 30 and 35 are withdrawn from the tubular body 5. As described above, the valve 4 enters the tubular body 5 and, resting on the platform 15, takes up the position stem upwards.

A command is issued to acutate the pressure fluid cylinder 32, and the rod 31 thereof brings the shutters 30 and 35 into the interior of the tubular body 5.

According to the command of the control system, the ring 3 to be fused advances in the described manner towards the tubular body 5. On entering the tubular body 5 through the transverse slot 9, the ring 3 gets into the space between the shutters 30 and 35. As the height of this space is less than the outer diameter of the ring 3, the latter, independently of the inertial forces, will come to rest on the lower shutter 30 a predetermined side downwards. According to a command, the pressure fluid cylinder 32 is actuated, and the shutters 30 and 35 are withdrawn from the tubular body 5, by the rod 31 of said cylinder. The ring 3, disposed on the shutter 30, drops over the stem of the valve 4. Hence forward the apparatus operates as described above.

This embodiment of the apparatus is recommended when, besides a need for use of the lower shutter, there is a need to place the ring onto the valve a predetermined side downwards. For instance, this embodiment is used when the ring to be fused is chamfered, and the rings fed along the chute are oriented by the chamfer.

We claim:

1. An apparatus for surfacing internal combustion engine valves by fusing refractory alloy rings applied to the seating surfaces of heads of the valves comprising:
    a means for fitting a ring to be fused onto a valve and for positioning the valve with its head downwards including: a vertically positioned tubular body having in its wall a transverse slot; a chute adjoining the upper end of said body and adapted for feeding thereto the valve with its head upwards; a chute ajoining the wall of said body and adapted for delivering the ring through said slot to the interior of said body; a thrust member arranged on an upper portion of said body and interacting with the valve stem so that the valve is positioned with its head downwards when said valve enters said body;
    a heating means for fusing the rings to the heads;
    a pushing means adapted for delivering the valve to said heating means and mounted underneath said body for reversible movement so that said pushing means is alternatively placed under said heating means and under said tubular body, said pushing means including:
    a platform adapted for receiving the valve head downwards; and
    a means for fixing the valve within said heating means.

2. An apparatus according to claim 1, wherein the wall of said tubular body has a horizontal slit disposed below said transverse slot; and wherein the apparatus further comprises a first plate-like shutter passed through said horizontal slit; and a pressure fluid cylinder connected to said shutter for reversible movement thereof.

3. An apparatus according to claim 2, wherein the wall of said tubular body has a second horizontal slit disposed above said transverse slot; and wherein said apparatus further comprises another plate-like shutter passed through said second horizontal slit and connected with the first shutter, said shutters being spaced apart from each other by a distance less than the outer diameter of the ring so that undesired turning over of the ring is prevented inside said tubular body.

4. An apparatus according to claim 1, further comprising guides; said pushing means including a carriage supporting said platform mounted on said guides; a vertically positioned pressure fluid cylinder and a pressure fluid cylinder connected to said carriage for reversible movement of the latter.

5. An apparatus according to one of claims 1 and 4, wherein said tubular body has an opening formed in the lower portion thereof for the passage of the stem of the valve when the latter is withdrawn from the tubular body.

6. An apparatus according to one of claims 1 and 4, wherein said pushing means includes a sleeve mounted on and in alignment with said platform, the distance between the upper end of said sleeve and a bearing surface of said platform is such that an upper internal edge of the sleeve restricts the angle of inclination of the valve to a value at which the projection of the center of gravity of the valve lies on a horizontal plane within the limits of the bearing surface of the valve.

* * * * *